United States Patent
Hirata et al.

(10) Patent No.: US 10,928,201 B2
(45) Date of Patent: Feb. 23, 2021

(54) POSITION ESTIMATION DEVICE

(71) Applicant: AISIN SEIKI KABUSHIKI KAISHA, Kariya (JP)

(72) Inventors: Hironori Hirata, Anjo (JP); Koichi Sassa, Ichinomiya (JP); Kenichi Ohshima, Wako (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 252 days.

(21) Appl. No.: 16/041,935

(22) Filed: Jul. 23, 2018

(65) Prior Publication Data
US 2019/0041218 A1 Feb. 7, 2019

(30) Foreign Application Priority Data
Aug. 3, 2017 (JP) .............................. JP2017-150750

(51) Int. Cl.
*G01C 22/00* (2006.01)
*G01C 21/14* (2006.01)

(52) U.S. Cl.
CPC ............ *G01C 21/14* (2013.01); *G01C 22/00* (2013.01)

(58) Field of Classification Search
CPC .......... G01C 21/14; G01C 22/00; B60R 1/00; B60R 2300/806; B60R 2300/80; B60W 30/06

See application file for complete search history.

(56) References Cited

U.S. PATENT DOCUMENTS

| 9,802,619 | B2 | 10/2017 | Denda | |
| 2010/0125414 | A1* | 5/2010 | Okuyama | ............ G01C 22/00 701/494 |

FOREIGN PATENT DOCUMENTS

| JP | 2010-269707 A | 12/2010 | |
| JP | 2010269707 A | * 12/2010 | ......... B62D 15/0285 |
| JP | 2016-103158 A | 6/2016 | |
| JP | 2016103158 A | * 6/2016 | ........... G01S 7/4808 |

* cited by examiner

*Primary Examiner* — Hunter B Lonsberry
*Assistant Examiner* — Daniel M. Robert
(74) *Attorney, Agent, or Firm* — Sughrue Mion, PLLC

(57) ABSTRACT

According to one embodiment, a position estimation device includes an acquirer that acquires wheel rotation information as information on rotation of wheels of a mobile structure and object information on an object, and an estimator that estimates a position of the mobile structure by calculating a directional deviation of a mobile structure as change in a direction of the mobile structure from the wheel rotation information and a predetermined direction parameter and calculating the direction of the mobile structure from the directional deviation of the mobile structure, and corrects the direction parameter on the basis of the directional deviation of the mobile structure and an object directional deviation as variation in a direction of the object relative to the mobile structure by calculating the object directional deviation from the object information.

5 Claims, 8 Drawing Sheets

POSITION ESTIMATION DEVICE

CROSS-REFERENCE TO RELATED APPLICATIONS

This application is based upon and claims the benefit of priority from Japanese Patent Application No. 2017-150750, filed Aug. 3, 2017, the entire contents of which are incorporated herein by reference.

FIELD

Embodiments described herein relate generally to a position estimation device.

BACKGROUND

For the purpose of providing assistance to the driver of a mobile structure such as a vehicle, devices for estimating the position of the mobile structure from a travel distance of the mobile structure have been known. Such devices correct deviation of estimates of the position, when it occurs, by correcting a distance parameter for calculating the travel distance of the mobile structure (disclosed in Japanese Laid-open Patent Application No. 2016-103158 and No. 2010-269707, for example).

However, the positions estimated only from the corrected distance parameter for the mobile structure may not be sufficient for providing driver assistance.

An aspect of this disclosure is to provide a position estimation device which can improve the accuracy of estimates of positions of the mobile structure by correcting a parameter.

A position estimation device according to an embodiment comprising: an acquirer that acquires wheel rotation information and object information on an object, the wheel rotation information representing rotation of a plurality of wheels of a mobile structure; and an estimator that calculates a directional deviation of the mobile structure from the wheel rotation information and a predetermined direction parameter and calculates a direction of the mobile structure from the directional deviation of the mobile structure to estimate a position of the mobile structure, and calculates a directional deviation of the object from the object information to correct the direction parameter on the basis of the directional deviation of the mobile structure and the directional deviation of the object, the directional deviation of the mobile structure representing change in a direction of the mobile structure, the directional deviation of the object representing change in a direction of the object relative to the mobile structure.

Thus, the position estimation device estimates the position of the mobile structure by calculating the direction of the mobile structure from the directional deviation of the mobile structure as the change in the direction of the mobile structure calculated based on the wheel rotation information on the rotation of the wheels. The position estimation device corrects the direction parameter on the basis of the directional deviation of the mobile structure and the deviation in the direction of the object calculated based on the object information. Thereby, the position estimation device can calculate the direction of the mobile structure more accurately than when correcting only the parameter for calculating the travel distance, to improve the accuracy of estimates of positions of the mobile structure.

In the position estimation device according to the embodiment, calculates a travel distance of the mobile structure on the basis of the wheel rotation information and a predetermined distance parameter and calculates a travel distance of the object relative to the mobile structure on the basis of the object information; corrects the distance parameter on the basis of the travel distance of the mobile structure and the travel distance of the object when the direction of the mobile structure falls within a predetermined first directional range with respect to a straight direction; and corrects the direction parameter when the direction of the mobile structure falls outside a second directional range which is more outside than the first directional range with respect to the straight direction.

Thus, the position estimation device corrects the distance parameter while the mobile structure travels substantially straight, which enables accurate calculation of the traveling distance of the mobile structure, thereby improving the accuracy of the correction of the distance parameter. Furthermore, the position estimation device corrects the direction parameter, which is difficult to correct during the straight travel of the mobile structure, while the mobile structure is turning, thereby improving the accuracy of the correction of the direction parameter.

In the position estimation device according to the embodiment, wherein the estimator corrects the direction parameter when the direction of the mobile structure falls outside the predetermined second directional range with respect to the straight direction and variation in the directional deviation of the mobile structure is within a predetermined deviation range.

Thus, the position estimation device corrects the direction parameter while the mobile structure is turning with a substantially constant turning radius and a steering remains substantially at the same position, thereby further improving the accuracy of the correction of the direction parameter.

In the position estimation device according to the embodiment, wherein the estimator corrects the direction parameter or the distance parameter when a speed of the mobile structure is lower than a threshold speed.

Thus, the position estimation device corrects the parameter during a low driving speed which enables accurate detection of the object, thereby improving the correction accuracy.

In the position estimation device according to the embodiment, wherein the estimator corrects the direction parameter or the distance parameter when a distance to the object is smaller than a predetermined threshold distance.

Thus, the position estimation device detects the object nearby the distance of which is accurately calculated, to correct the parameter, thereby improving the correction accuracy.

In the position estimation device according to the embodiment, wherein the estimator corrects the direction parameter or the distance parameter on the basis of the wheel rotation information acquired in a period or a section other than a predetermined period or section after shifting of a transmission for switching a gear ratio and forward and backward traveling directions of the mobile structure.

Thus, the position estimation device corrects the parameter on the basis of the accurate travel distance of the mobile structure calculated not immediately after the shifting of the transmission, thereby improving the correction accuracy.

SUMMARY

DETAILED DESCRIPTION

Figure 1:
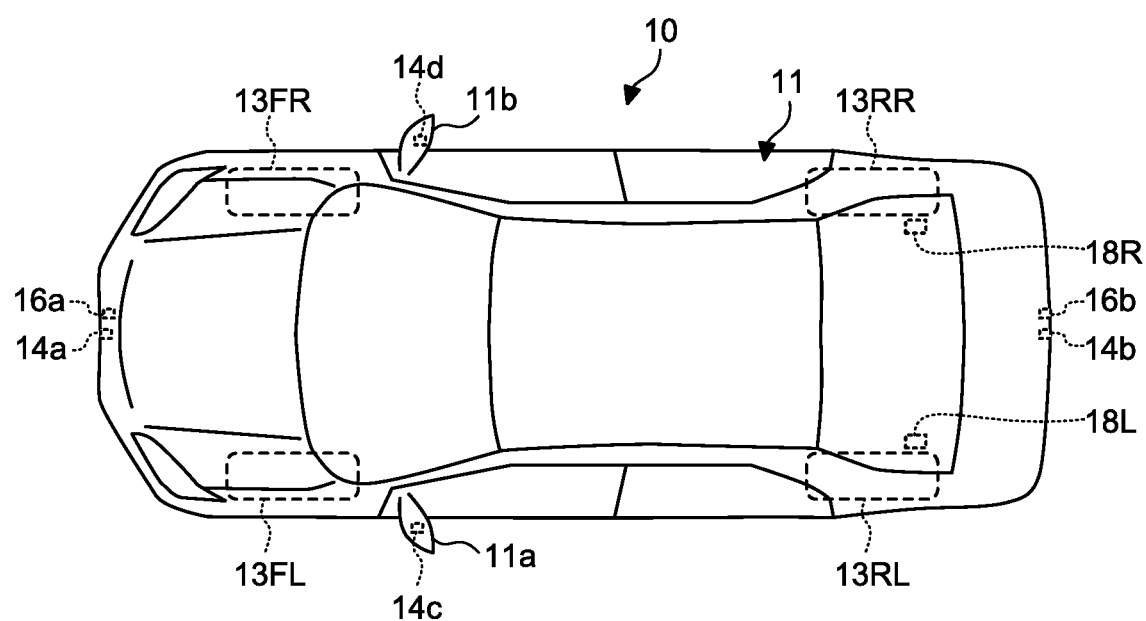
FIG. 1 is a plan view of a vehicle on which a position estimation system according to an embodiment is mounted.

Throughout the following exemplary embodiment and modification, similar or same components are denoted by common reference numerals and overlapping description thereof is appropriately omitted.

Embodiment

FIG. 1 is a plan view of a vehicle 10 on which a position estimation system according to an embodiment is mounted. The vehicle 10 is an example of a mobile structure. The vehicle 10 may be, for example, an automobile (internal combustion engine automobile) including an internal combustion engine (engine, not illustrated) as a drive source, an automobile (electric automobile, fuel cell automobile, or the like) including an electric motor (motor, not illustrated) as a drive source, or an automobile (hybrid automobile) including both of them as drive sources. The vehicle 10 can incorporate various transmissions and various devices (systems and parts) necessary for driving the internal combustion engine and/or the electric motor. Systems, numbers, and layouts of devices for driving wheels 13 of the vehicle 10 can be variously set.

As illustrated in FIG. 1, the vehicle 10 includes a vehicle body 11, a plurality of (four in the embodiment) wheels 13FL, 13FR, 13RL, and 13RR, one or a plurality of (four in the embodiment) imagers 14a, 14b, 14c, and 14d, one or a plurality of (two in the embodiment) ranging units 16a and 16b, and a plurality of (two in the embodiment) wheel-speed sensors 18L and 18R. The wheels 13FL, 13FR, 13RL, and 13RR are collectively referred to as wheels 13 unless they need to be distinguished from one another. The imagers 14a, 14b, 14c, and 14d are collectively referred to as imagers 14 unless they need to be distinguished from one another. The ranging units 16a and 16b are collectively referred to as ranging units 16 unless they need to be distinguished from each other. The wheel-speed sensors 18L and 18R are collectively referred to as wheel-speed sensors 18 unless they need to be distinguished from each other.

The vehicle body 11 defines a vehicle interior in which an occupant or occupants ride(s). The vehicle body 11 accommodates or holds the wheels 13, the imagers 14, the ranging units 16, and the wheel-speed sensors 18.

The wheel 13FL is provided on a front left of the vehicle 10. The wheel 13FR is provided on a front right of the vehicle 10. The wheel 13RL is provided on a rear left of the vehicle 10. The wheel 13RR is provided on a rear right of the vehicle 10. The two front wheels 13FL and 13FR function as turning wheels that change the traveling direction of the vehicle 10. The two rear wheels 13RL and 13RR function as, for example, driving wheels that rotate with driving power from the engine or the motor.

The imagers 14 are, for example, digital cameras incorporating image sensors such as charge coupled devices (CCDs) and CMOS image sensors (CISs). The imagers 14 output, as image data, moving data including frame images generated at a predetermined frame rate, or still images. The imagers 14 each include a wide-angle lens or a fish-eye lens and can shoot the horizontal range of 140° to 190°. The optical axes of the imagers 14 are set obliquely downward. The imagers 14 output image data containing images of the surroundings, including objects and a peripheral road surface, of the vehicle 10. The images are an example of object information on the object.

The imagers 14 are mounted in the periphery of the vehicle body 11 and function as a multi-view camera (MVC). For example, the imager 14a is mounted at a lateral center (for example, a front bumper) of the front end of the vehicle body 11. The imager 14a generates images of the surroundings ahead of the vehicle 10. The imager 14b is mounted at a lateral center (for example, a rear bumper) of the rear end of the vehicle body 11. The imager 14b generates images of the surroundings behind the vehicle 10. The imager 14c is mounted at a lengthwise center (for example, a left-side side mirror 11a) of the left end of the vehicle body 11. The imager 14c generates images of the leftward surroundings of the vehicle 10. The imager 14d is mounted at a lengthwise center (for example, a right-side side mirror 11b) of the right end of the vehicle body 11. The imager 14d generates images of the rightward surroundings of the vehicle 10.

The ranging units 16 are, for example, sonars that output detection waves such as ultrasonic waves and senses the waves reflected by objects around the vehicle 10. The ranging units 16 may be laser radars that output and sense detection waves such as laser light. The ranging units 16 detect and output ranging information on directions of the objects and distances to the objects around the vehicle 10. The ranging units 16 detect, as the ranging information, the directions of the objects around the vehicle 10 and transmission and reception time taken for transmitting and receiving the detection waves, for example. The ranging units 16 are provided in the outer periphery of the vehicle 10. To be specific, the ranging unit 16a is provided at a lateral center (for example, the front bumper) of the front end of the vehicle body 11. The ranging unit 16a detects and outputs the ranging information including the directions of the objects ahead of the vehicle 10 and the transmission and reception time used for calculating the distances to the objects. The ranging unit 16b is provided at a lateral center (for example, the rear bumper) of the rear end of the vehicle body 11. The ranging unit 16b detects and outputs the ranging information including the directions of the objects behind the vehicle 10 and the transmission and reception time used for calculating the distances to the objects.

The wheel-speed sensors 18 include hall elements provided in the vicinity of the respective wheels 13. The wheel-speed sensors 18 detect the rotating amounts of the respective wheels 13 or the rotation speeds thereof per unit time. The wheel-speed sensors 18 detect and output, as information on the rotation of the wheels 13, wheel rotation information indicating the wheel-speed pulse numbers corresponding to the rotating amounts or the rotation speeds. To be specific, the wheel-speed sensor 18L is provided in the vicinity of the rear left wheel 13RL. The wheel-speed sensor 18L detects and outputs, as the wheel rotation information on the rotation of the wheel 13RL, the wheel-speed pulse number of the rear left wheel 13RL. The wheel-speed sensor 18R is provided in the vicinity of the rear right wheel 13RR. The wheel-speed sensor 18R detects and outputs, as the wheel rotation information on the rotation of the wheel 13RR, the wheel-speed pulse number of the wheel 13RR.

Figure 2:
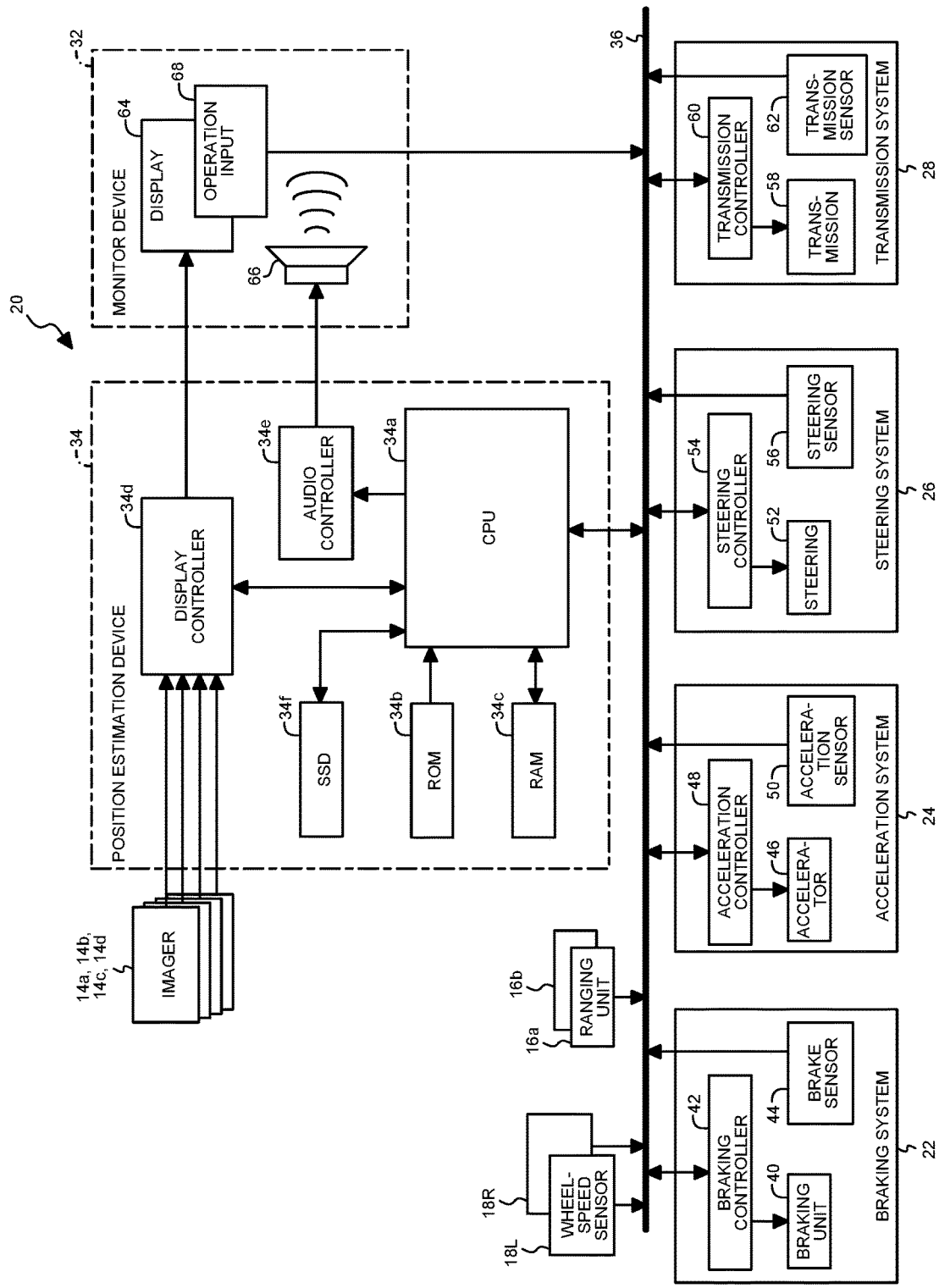
FIG. 2 is a block diagram illustrating the entire configuration of the position estimation system in the embodiment.

FIG. 2 is a block diagram illustrating the entire configuration of a position estimation system 20 in the embodiment. The position estimation system 20 is mounted on the vehicle 10 and estimates the current position of the vehicle 10 for automatic driving (including partial automatic driving) of the vehicle 10. The position estimation system 20 corrects parameters for estimating the current position of the vehicle 10.

As illustrated in FIG. 2, the position estimation system 20 includes the imagers 14, the wheel-speed sensors 18, a braking system 22, an acceleration system 24, a steering system 26, a transmission system 28, a monitor device 32, a position estimation device 34, and an in-vehicle network 36.

The imagers 14 output, to the position estimation device 34, the images of the surroundings of the vehicle 10.

The wheel-speed sensors 18 output detected wheel rotation information to the in-vehicle network 36.

The braking system 22 controls deceleration of the vehicle 10. The braking system 22 includes a braking unit 40, a braking controller 42, and a brake sensor 44.

The braking unit 40 is, for example, a device including a brake and a brake pedal to decelerate the vehicle 10.

The braking controller 42 is, for example, a computer including a microcomputer such as an electronic control unit (ECU) having a hardware processor such as a central processing unit (CPU). The braking controller 42 controls the braking unit 40 to control the deceleration of the vehicle 10, in response to an instruction from the position estimation device 34.

The brake sensor 44 is, for example, a position sensor, and detects the position of the braking unit 40 as the brake pedal. The brake sensor 44 outputs, to the in-vehicle network 36, the detected position of the braking unit 40.

The acceleration system 24 controls the acceleration of the vehicle 10. The acceleration system 24 includes an accelerator 46, an acceleration controller 48, and an acceleration sensor 50.

The accelerator 46 is, for example, a device including an accelerator pedal to accelerate the vehicle 10.

The acceleration controller 48 is, for example, a computer including a microcomputer such as an ECU having a hardware processor such as a CPU. The acceleration controller 48 controls the accelerator 46 to control the acceleration of the vehicle 10, in response to an instruction from the position estimation device 34.

The acceleration sensor 50 is, for example, a position sensor, and detects the position of the accelerator 46 as the accelerator pedal. The acceleration sensor 50 outputs, to the in-vehicle network 36, information on the detected position of the accelerator 46.

The steering system 26 controls the traveling direction of the vehicle 10. The steering system 26 includes a steering 52, a steering controller 54, and a steering sensor 56.

The steering 52 is, for example, a device including a steering wheel to operate the turning wheels (for example, the wheels 13FL and 13FR) of the vehicle 10.

The steering controller 54 is, for example, a computer including a microcomputer such as an ECU having a hardware processor such as a CPU. The steering controller 54 controls the steering 52 to control the traveling direction of the vehicle 10, in accordance with a steering angle instructed from the position estimation device 34.

The steering sensor 56 is, for example, an angle sensor including a hall element and outputs a rotational position (for example, a rotating angle) of the steering 52. The steering sensor 56 outputs a detected rotating angle to the in-vehicle network 36 as information on the position of the steering 52.

The transmission system 28 controls the gear ratio of the vehicle 10. The transmission system 28 includes a transmission 58, a transmission controller 60, and a transmission sensor 62.

The transmission 58 is, for example, a device including a shift lever to switch the gear ratio of the vehicle 10 and the traveling directions, forward and backward, of the vehicle 10.

The transmission controller 60 is, for example, a computer including a microcomputer such as an ECU having a hardware processor such as a CPU. The transmission controller 60 controls the transmission 58 to control the gear ratio or the traveling direction, forward or backward, of the vehicle 10 in response to an instruction from the position estimation device 34.

The transmission sensor 62 detects the shift position of the transmission 58, such as drive, parking, and reverse. The transmission sensor 62 outputs the detected position of the transmission 58 to the in-vehicle network 36.

The monitor device 32 is mounted in a dashboard in the interior of the vehicle 10. The monitor device 32 includes a display 64, an audio output 66, and an operation input 68.

The display 64 displays an image on the basis of image data transmitted from the position estimation device 34. The display 64 is, for example, a display device such as a liquid crystal display (LCD) and an organic electroluminescent display (OELD). The display 64 displays, for example, images for driver assistance including parking assistance.

The audio output 66 outputs audio on the basis of audio data transmitted from the position estimation device 34. The audio output 66 is, for example, a speaker. The audio output 66 outputs, for example, audio for driver assistance including parking assistance.

The operation input 68 receives inputs from an occupant. The operation input 68 is, for example, a touch panel. The operation input 68 is provided on the screen of the display 64. The operation input 68 allows images on the display 64 to be see-through. The operation input 68 thereby allows the occupant to view the image on the screen of the display 64. The operation input 68 receives an occupant's instruction for the position estimation or the driver assistance through an occupant's touch on a position corresponding to the image displayed on the screen of the display 64 and transmits it to the position estimation device 34. The operation input 68 receives, for example, inputs for the driver assistance including the parking assistance. The operation input 68 is not limited to the touch panel and may be a push-button hard switch.

The position estimation device 34 is a computer including a microcomputer such as an electronic control unit (ECU). The position estimation device 34 acquires image data from the imagers 14. The position estimation device 34 generates data on images or audio on the basis of the image data and transmits it to the monitor device 32. The position estimation device 34 transmits, to the monitor device 32, image data or audio data for instructing a driver or giving notices to the driver. The position estimation device 34 acquires the generated images and information as the wheel rotation information through the in-vehicle network 36 to estimate the current position of the vehicle 10. The current position of the vehicle 10 is an example of a position of a mobile structure. The position estimation device 34 controls the respective systems 22, 24, 26, and 28 through the in-vehicle network 36 on the basis of the current position of the vehicle 10 to implement automatic driving of the vehicle 10 for driver assistance at the time of parking, for example. The position estimation device 34 includes a central processing unit (CPU) 34a, a read only memory (ROM) 34b, a random access memory (RAM) 34c, a display controller 34d, an audio controller 34e, and a solid state drive (SSD) 34f. The CPU 34a, the ROM 34b, and the RAM 34c may be integrated in the same package.

The CPU 34a is an example of a hardware processor, and reads programs from a non-volatile memory such as the ROM 34b and executes various types of computation and control by the programs. The CPU 34a executes position estimation processing for estimating the current position of the vehicle 10, for example.

The ROM 34b stores therein the programs and parameters necessary for executing the programs. The RAM 34c temporarily stores therein various types of data used for the computation by the CPU 34a. Among the computation by the position estimation device 34, the display controller 34d mainly executes image processing on images from the imagers 14, and image data conversion for display on the display unit 64. The audio controller 34e mainly executes processing on the audio output from the audio output 66. The SSD 34f is a rewritable non-volatile memory device and holds data during the power-off of the position estimation device 34.

The in-vehicle network 36 connects the wheel-speed sensors 18, the braking system 22, the acceleration system 24, the steering system 26, the transmission system 28, the operation input 68 of the monitor device 32, and the position estimation device 34 to one another to be able to mutually transmit and receive information.

Figure 3:
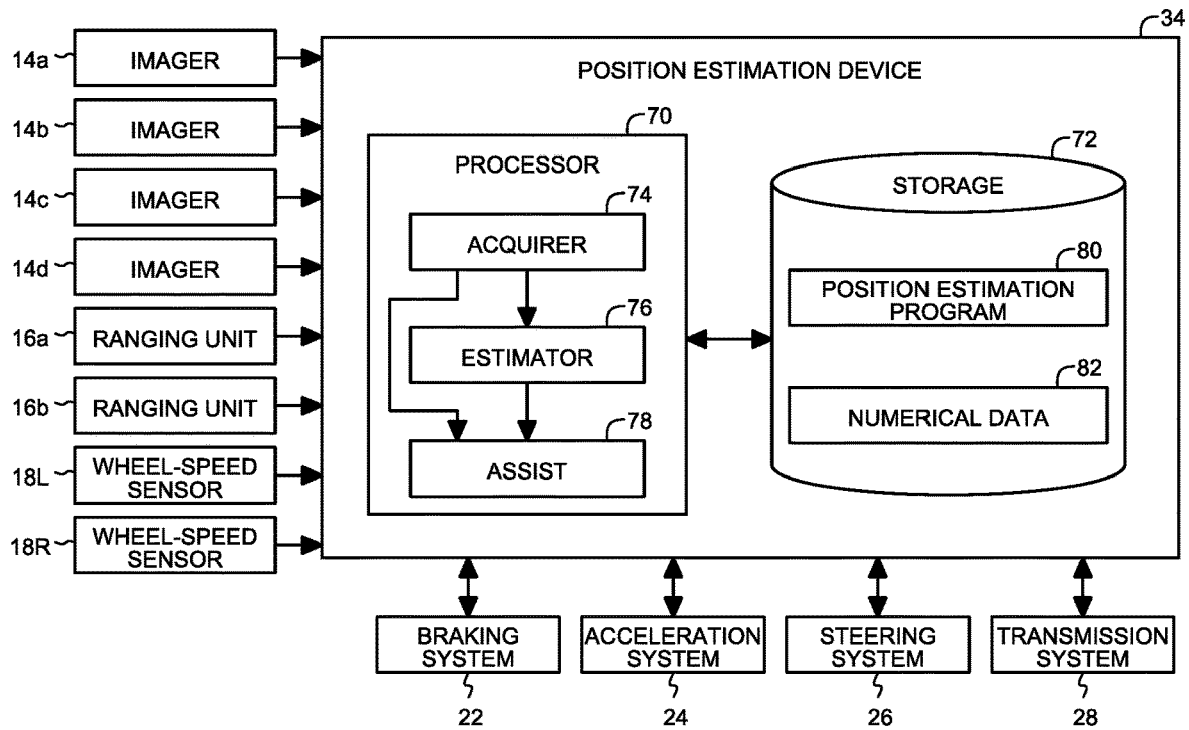
FIG. 3 is a functional block diagram for explaining functions of a position estimation device.

FIG. 3 is a functional block diagram for explaining functions of the position estimation device 34. As illustrated in FIG. 3, the position estimation device 34 includes a processor 70 and a storage 72.

The processor 70 is implemented as, for example, the functions of the CPU 34a. The processor 70 includes an acquirer 74, an estimator 76, and an assist 78. The processor 70 may implement the functions of the acquirer 74, the estimator 76, and the assist 78 by loading a position estimation program 80 from the storage 72, for example. Part or all of the acquirer 74, the estimator 76, and the assist 78 may be configured by hardware such as circuitry including an application specific integrated circuit (ASIC).

The acquirer 74 acquires the wheel rotation information from the wheel-speed sensors 18L and 18R through the in-vehicle network 36. The acquirer 74 acquires image data including an object image from each of the imagers 14. The acquirer 74 acquires the ranging information of the object from each of the ranging units 16. The acquirer 74 acquires the positional information on the braking unit 40, the accelerator 46, the steering 52, and the transmission 58 from the sensors 44, 50, 56, and 62, respectively. The acquirer 74 outputs the acquired information to the estimator 76 and the assist 78.

The estimator 76 acquires, from the acquirer 74, the wheel rotation information detected by the wheel-speed sensors 18L and 18R to estimate the current position of the vehicle 10. To be specific, the estimator 76 calculates the travel distance of the vehicle 10 on the basis of the wheel rotation information and a predetermined distance parameter. For example, the estimator 76 calculates the vehicle travel distance from the distance parameter and an arithmetic average of an amount of variation in the wheel-speed pulse number of the wheel 13RL indicated by the wheel rotation information detected by the wheel-speed sensor 18L and an amount of variation in the wheel-speed pulse number of the wheel 13RR indicated by the wheel rotation information detected by the wheel-speed sensor 18R. The estimator 76 calculates the direction of the vehicle 10 from wheel rotation information and a predetermined direction parameter. For example, the estimator 76 calculates a deviation of the vehicle direction or vehicle directional deviation as change in the direction of the vehicle 10 from the direction parameter and a difference between the amounts of variation in the wheel-speed pulse numbers of the wheel 13RL and the wheel 13RR indicated by the wheel rotation information detected by the wheel-speed sensor 18L and indicated by the wheel rotation information detected by the wheel-speed sensor 18R, respectively. The estimator 76 calculates the direction of the vehicle 10 from the vehicle directional deviation. The estimator 76 estimates the current position of the vehicle 10 from the travel distance and the direction of the vehicle 10. The estimator 76 outputs the estimated current position to the assist 78.

The estimator 76 acquires the images generated by the imagers 14 from the acquirer 74 and corrects the distance parameter and the direction parameter for estimating the current position of the vehicle 10, on the basis of the wheel rotation information and the images. For example, the estimator 76 calculates the travel distance of an object relative to the vehicle 10 on the basis of the images including images of the object. The estimator 76 corrects the distance parameter on the basis of the vehicle travel distance and the object travel distance. The estimator 76 calculates a deviation of the direction of an object or object directional deviation as change in the direction of the object relative to the vehicle 10 on the basis of the images including images of the object. The estimator 76 corrects the direction parameter on the basis of the directional deviations of the vehicle 10 and the object. The estimator 76 stores, in the storage 72, the corrected distance parameter and the corrected direction parameter as a new distance parameter and a new direction parameter. Upon correcting the distance parameter and the direction parameter twice or more, the estimator 76 may store, in the storage 72, average values or medians of the parameters as new parameters corrected and learned. After storing the new distance parameter and the new direction parameter in the storage 72, the estimator 76 estimates the current position of the vehicle 10 from the new distance parameter and the new direction parameter. The estimator 76 may correct the parameters during both automatic driving and manual driving.

The estimator 76 in the embodiment corrects the parameters for estimating the current position of the vehicle 10 upon satisfaction of predefined correction conditions. The estimator 76 determines whether to correct the distance parameter or the direction parameter on the basis of a distance correction condition for correcting the distance parameter and direction correction conditions for correcting the direction parameter.

To be specific, the estimator 76 corrects the distance parameter or the direction parameter when any of the following first, second, third, and fourth correction conditions is satisfied. In other words, the estimator 76 corrects no parameter when none of the first, second, third, and fourth correction conditions is satisfied.

First Correction Condition: the vehicle travel distance is larger than a predetermined threshold travel distance.

Second Correction Condition: the distance from the vehicle 10 to the object is smaller than a predetermined threshold distance.

Third Correction Condition: outside of a predetermined threshold shifting period or section after shifting of the transmission 58.

Fourth Correction Condition: the vehicle speed is smaller than a predetermined threshold speed.

The first correction condition is a condition for setting the vehicle travel distance to a relatively large value to improve accuracy of the calculation of the vehicle travel distance and accuracy of the correction. The second correction condition is a condition for detecting a nearby object with higher resolution of the imagers 14 to improve the correction accuracy. The estimator 76 may determine whether the distance to the object, calculated from the images or the ranging information, satisfies the second correction condition. The shifting of the transmission 58 in the third correction condition includes switching of the gear ratio and switching of the frontward and backward directions. The third correction condition defines the threshold shifting period or section that corresponds to a predetermined period or a predetermined section after shifting of the transmission 58. The period is set on the basis of time and the section is set on the basis of a distance. The third correction condition is for preventing the parameter correction based on a less accurate vehicle travel distance calculated from the wheel rotation information acquired immediately after the transmission 58 is shifted. That is, the third correction condition is a condition for correcting the distance parameter or the direction parameter on the basis of the wheel rotation information calculated in a period or a section outside of the threshold shifting period or section after the shifting of the transmission 58, which enhances the accuracy of the calculation of the vehicle travel distance, to improve the correction accuracy. The estimator 76 may determine whether the positional information of the transmission 58 detected by the transmission sensor 62 satisfies the third correction condition. The fourth correction condition is a condition for correcting the parameter during a low driving speed at which objects are accurately detected, to improve the correction accuracy. The estimator 76 may determine whether the vehicle speed calculated from the wheel-speed pulse number indicated by the wheel rotation information satisfies the fourth correction condition.

The estimator 76 corrects the distance parameter upon satisfaction of the following distance correction condition based on accurately calculated vehicle travel distance.

Distance Correction Condition: the direction of the vehicle 10 falls within a predetermined first directional range with respect to straight direction.

The distance correction condition is a condition for correcting the distance parameter when the vehicle 10 travels substantially straight, which enables accurate calculation of the vehicle travel distance. When the steering angle of the steering 52 is smaller than a predetermined first threshold steering angle, the estimator 76 may determine that the direction of the vehicle 10 is within the first directional range, satisfying the distance correction condition. When the estimated vehicle directional deviation is smaller than a first threshold directional deviation, the estimator 76 may determine that the direction of the vehicle 10 is within the first directional range, satisfying the distance correction condition.

The estimator 76 corrects the direction parameter upon satisfaction of the following first and second direction correction conditions under which the direction of the vehicle 10 can be accurately calculated.

First Direction Correction Condition: the direction of the vehicle 10 falls outside a predetermined second directional range with respect to straight direction.

Second Direction Correction Condition: the variation in the deviation of the vehicle direction is within a predetermined deviation range.

The first direction correction condition is a condition for correcting the direction parameter during the turning of the vehicle 10 in which the direction of the vehicle 10 can be calculated. The second directional range is set outside of the first directional range. When the steering angle of the steering 52 is equal to or larger than a second threshold steering angle, the estimator 76 may determine that the direction of the vehicle 10 is outside the second directional range, satisfying the first direction correction condition. The second threshold steering angle only needs to be the first threshold steering angle or larger and the second threshold steering angle may be equal thereto. When the estimated vehicle directional deviation is equal to or larger than the second threshold directional deviation, the estimator 76 may determine that the direction of the vehicle 10 is outside the second directional range, satisfying the first direction correction condition. The second threshold directional deviation only needs to be the first threshold directional deviation or larger and the second threshold directional deviation may be equal thereto. The first distance correction condition and the first direction correction condition cannot be satisfied at the same time, therefore, the estimator 76 corrects either the distance parameter or the direction parameter upon satisfaction of the condition. The second direction correction condition is a condition for determining whether the vehicle directional deviation is substantially constant and the vehicle 10 turns with a certain turning radius so as to more accurately calculate the direction of the vehicle 10. Satisfaction of the second direction correction condition may be determined when the variation in the steering angle of the steering 52 or the variation in the vehicle directional deviation is within a predetermined variation range.

The assist 78 sets a target position such as a parking position and a route to the target position on the basis of the images and the ranging information acquired from the acquirer 74. The assist 78 controls the controllers 42, 48, 54, and 60 of the respective systems 22, 24, 26, 28 on the basis of the current position of the vehicle 10 estimated by the estimator 76 to automatically drive the vehicle 10 to the target position.

The storage 72 is implemented as the function of at least one of the ROM 34b, the RAM 34c, and the SSD 34f. The storage 72 may be provided on an external network, for example. The storage 72 stores therein the programs to be executed by the processor 70, the data necessary for executing the programs, and data generated through the execution of the programs. The storage 72 stores therein, for example, the position estimation program 80 to be executed by the processor 70. The storage 72 stores therein the distance parameter for calculating the travel distance, the direction parameter for calculating the direction of the vehicle 10, and numerical data 82 including the respective thresholds for determining the correction conditions, which are necessary for executing the position estimation program 80. The storage 72 temporarily stores therein the vehicle travel distance, the direction and the current position of the vehicle 10, and the target position calculated through the execution of the position estimation program 80.

Figure 4:
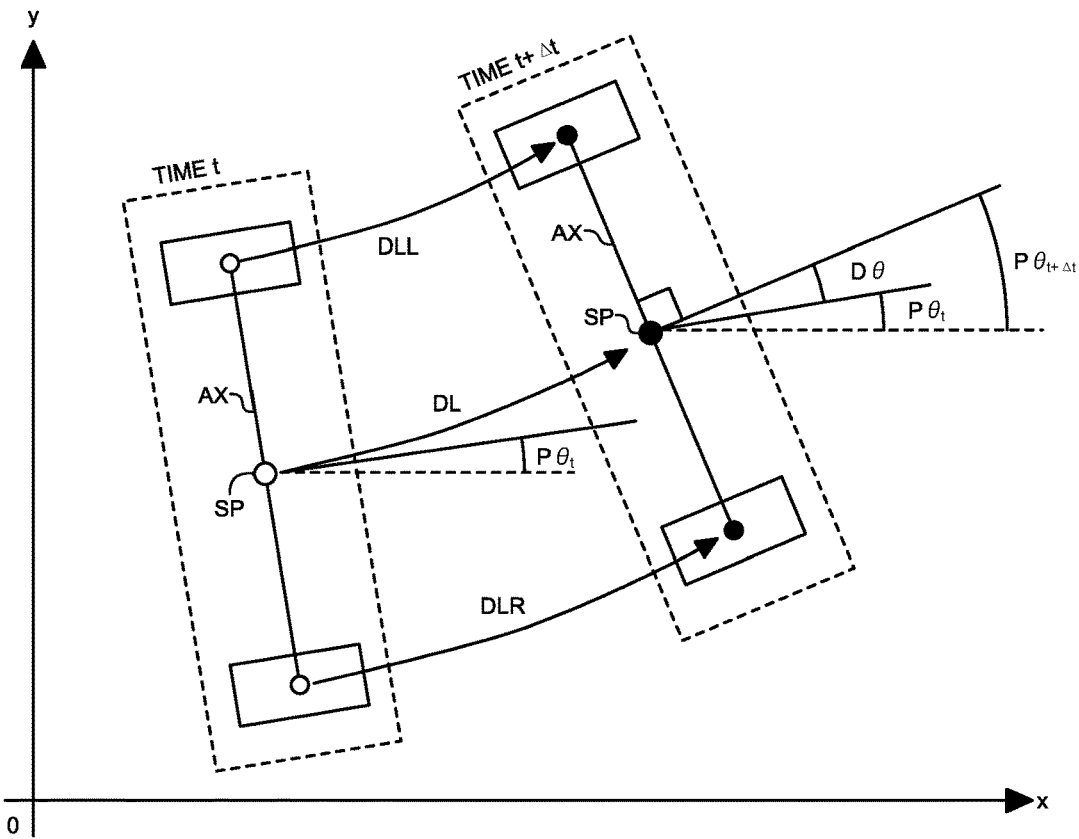
FIG. 4 is a plan view for explaining a method for calculating a vehicle travel distance by an estimator.

Next, a method for calculating a travel distance DL of the vehicle 10 by the estimator 76 will be described. FIG. 4 is a plan view for explaining the method for calculating the vehicle travel distance DL by the estimator 76. The vehicle travel distance DL is, for example, the travel distance of a current position SP of the vehicle 10. The current position SP is, for example, defined to be the center of a rear wheel shaft AX that connects the rear wheels 13RL and 13RR of the vehicle 10. The x axis and the y axis in FIG. 4 may be appropriately defined. For example, the x axis may be defined as a direction in parallel with the traveling direction of the vehicle 10 when the assist 78 starts the driver assistance and the y axis may be defined as a direction orthogonal to the x axis. Calculation of the travel distance DL of the vehicle 10 moved in a period from time t to time $t+\Delta t$, both of which are surrounded by dotted-line rectangles, will be described with reference to FIG. 4. $\Delta t$ may represent, for example, a cycle with which the acquirer 74 acquires the wheel rotation information indicating the wheel-speed pulse number or a cycle with which the estimator 76 calculates the vehicle travel distance DL. Trajectories of the turning wheels 13 are in arc form but are approximated as straight lines herein because the vehicle travel distance DL is short.

A travel distance DLL of the rear left wheel 13RL can be calculated by the following equation (1) containing a travel distance DP per wheel-speed pulse and a wheel-speed pulse variation amount PL calculated from the wheel rotation information output from the wheel-speed sensor 18L. The travel distance DP per wheel-speed pulse is an example of the distance parameter. The wheel-speed pulse variation amount PL is the wheel-speed pulse number of the wheel 13RL detected by the wheel-speed sensor 18L in the period from the time t to the time $t+\Delta t$.

$$DLL = DP \cdot PL \quad (1)$$

A travel distance DLR of the rear right wheel 13RR can be calculated by the following equation (2) containing the travel distance DP per wheel-speed pulse and a wheel-speed pulse variation amount PR calculated from the wheel rotation information output from the wheel-speed sensor 18R. The wheel-speed pulse variation amount PR is the wheel-speed pulse number of the wheel 13RR detected by the wheel-speed sensor 18R in the period from the time t to the time $t+\Delta t$.

$$DLR = DP \cdot PR \quad (2)$$

The travel distance DL of the current position SP of the vehicle 10 can be regarded as an arithmetic mean value of the travel distance DLL and the travel distance DLR. The estimator 76 may thus calculate the vehicle travel distance DL by the following equation (3) containing the arithmetic mean value of the wheel-speed pulse variation amounts PL and PR.

$$DL = 0.5 \cdot (DLL + DLR) \quad (3)$$
$$= 0.5 \cdot DP \cdot (PL + PR)$$

Figure 5:
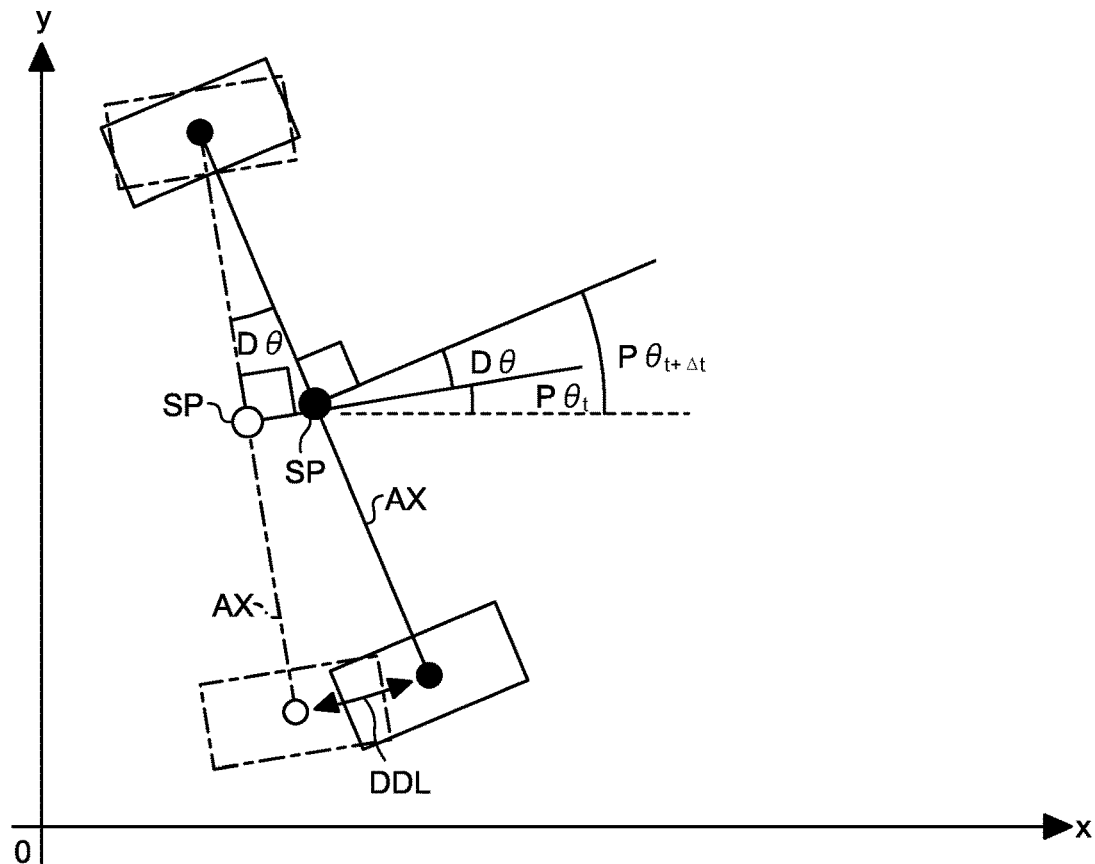
FIG. 5 is a plan view for explaining a method for calculating the direction of the vehicle by the estimator.

Next, a method for calculating a direction $P\theta_{t+\Delta t}$ of the vehicle 10 at the time $t+\Delta t$ by the estimator 76 will be described. FIG. 5 is a plan view for explaining the method for calculating the direction $P\theta_{t+\Delta t}$ of the vehicle 10 by the estimator 76. With reference to FIGS. 4 and 5, a description will be made on the method of calculating a deviation $D\theta$ of the vehicle direction as change in the direction of the vehicle 10 moved in the period from the time t to the time $t+\Delta t$ both surrounded by the dotted-line rectangles in FIG. 4, and then calculating the direction $P\theta_{t+\Delta t}$. FIG. 5 shows the directions of the vehicle 10 at the time t and the time $t+\Delta t$ with the centers of the rear left wheel 13RL coinciding with each other.

A travel distance deviation DDL as difference between the travel distance DLL of the rear left wheel 13RL and the travel distance DLR of the rear right wheel 13RR can be calculated by the following equation (4):

$$DDL = DP \cdot (PR - PL) \quad (4)$$

The vehicle directional deviation $D\theta$ may thus be calculated by the following equation (5) containing the difference between the right and left wheel-speed pulse variation amounts PR and PL indicated by the wheel rotation information and the length TR of the rear wheel shaft AX. The length TR of the rear wheel shaft AX is an example of the direction parameter. The equation (5) is derived by an approximate expression "$D\theta = \sin D\theta$" that is satisfied when the vehicle directional deviation $D\theta$ is sufficiently small.

$$D\theta = DDL \cdot TR \quad (5)$$
$$= DP \cdot (PR - PL) \cdot TR$$

The estimator 76 may calculate the direction $P\theta_{t+\Delta t}$ of the vehicle 10 at the time $t+\Delta t$ by the following equation (6) containing the vehicle directional deviation $D\theta$ and the direction $P\theta_t$ of the vehicle 10 at the time t. The directions $P\theta_{t+\Delta t}$ and $PO_t$ of the vehicle 10 are referred to as directions $P\theta$ unless they need to be distinguished from each other.

$$P\theta_{t+\Delta t} = P\theta_t + D\theta \quad (6)$$

The estimator 76 calculates or estimates the x coordinate and the y coordinate of the current position SP on the basis of the calculated vehicle travel distance DL and the calculated direction $P\theta_{t+\Delta t}$.

Figure 6:
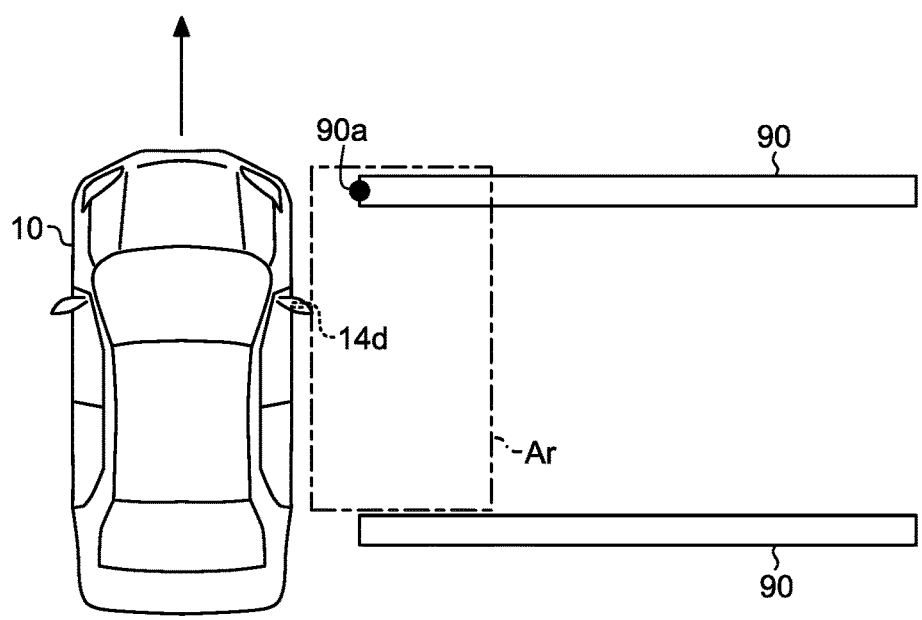
FIG. 6 is a plan view for explaining correction of a travel distance per wheel-speed pulse by the estimator.
Figure 7:
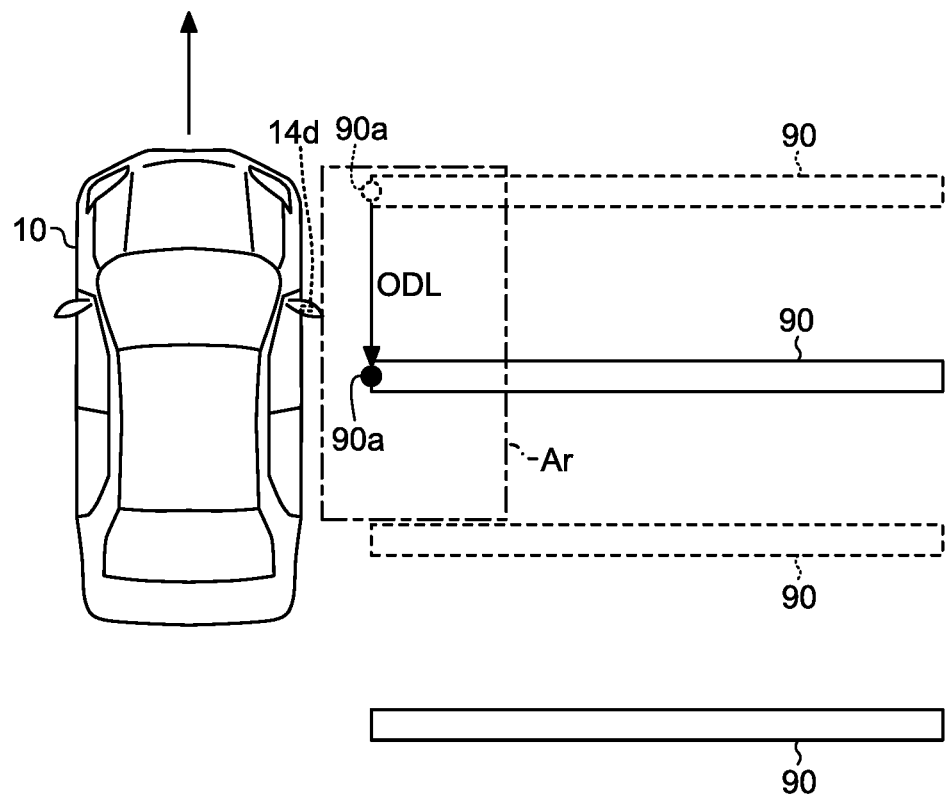
FIG. 7 is a plan view for explaining the correction of the travel distance per wheel-speed pulse by the estimator.

Next, a description will be made on correction (hereinafter, travel-distance correction) of the travel distance DP per wheel-speed pulse being the distance parameter for calculating the vehicle travel distance DL by the estimator 76. FIGS. 6 and 7 are plan views for explaining the correction of the travel distance DP per wheel-speed pulse by the estimator 76. FIG. 6 is a plan view at the time ta and FIG. 7 is a plan view at the time $ta+\Delta t$. In FIGS. 6 and 7, an imaging region Ar of the imager 14 (for example, the imager 14d) is represented by a dashed-dotted line rectangle.

As illustrated in FIG. 6, the vehicle 10 at the time ta travels forward on a road surface on which objects 90 are set. The objects 90 are, for example, partition lines on the road surface in a parking area. While the vehicle 10 at the time $ta+\Delta t$ travels to a position illustrated in FIG. 7, the objects 90 move relatively to the vehicle 10. A relative travel distance of the objects 90 is defined as an object travel distance ODL. The estimator 76 calculates the object travel distance ODL from, for example, the positions of a front end 90a of the object 90 in the images generated by the imager 14 at the time ta and at the time $ta+\Delta t$. The travel distance DL of the current position SP of the vehicle 10 matches the object travel distance ODL when the travel distance DP per wheel-speed pulse is accurate. Thus, a difference between the travel distance DL of the current position SP and the object travel distance ODL signifies occurrence of error in the current travel distance DP per wheel-speed pulse. In this case, the estimator 76 calculates a new travel distance DP per wheel-speed pulse by the following equation (7) containing the arithmetic mean of the right and left wheel-speed pulse variation amounts PR and PL and corrects the current travel distance DP to the new one. The estimator 76 stores, in the storage unit 72, the new travel distance DP per wheel-speed pulse.

$$DP = ODL/0.5 \cdot (PL+PR) \qquad (7)$$

Figure 8:
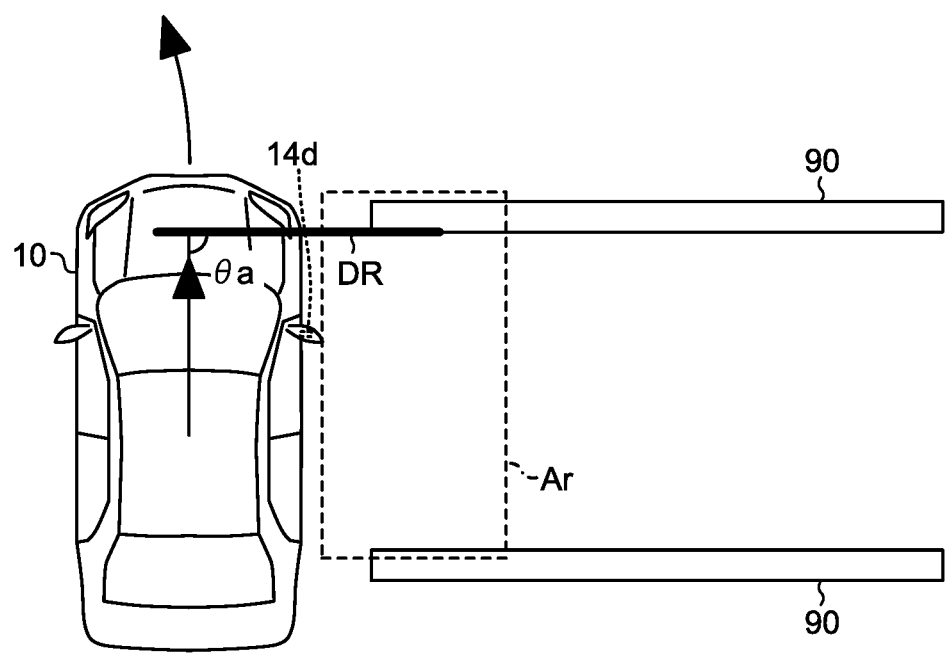
FIG. 8 is a plan view for explaining correction of the length of a rear wheel shaft by the estimator.
Figure 9:
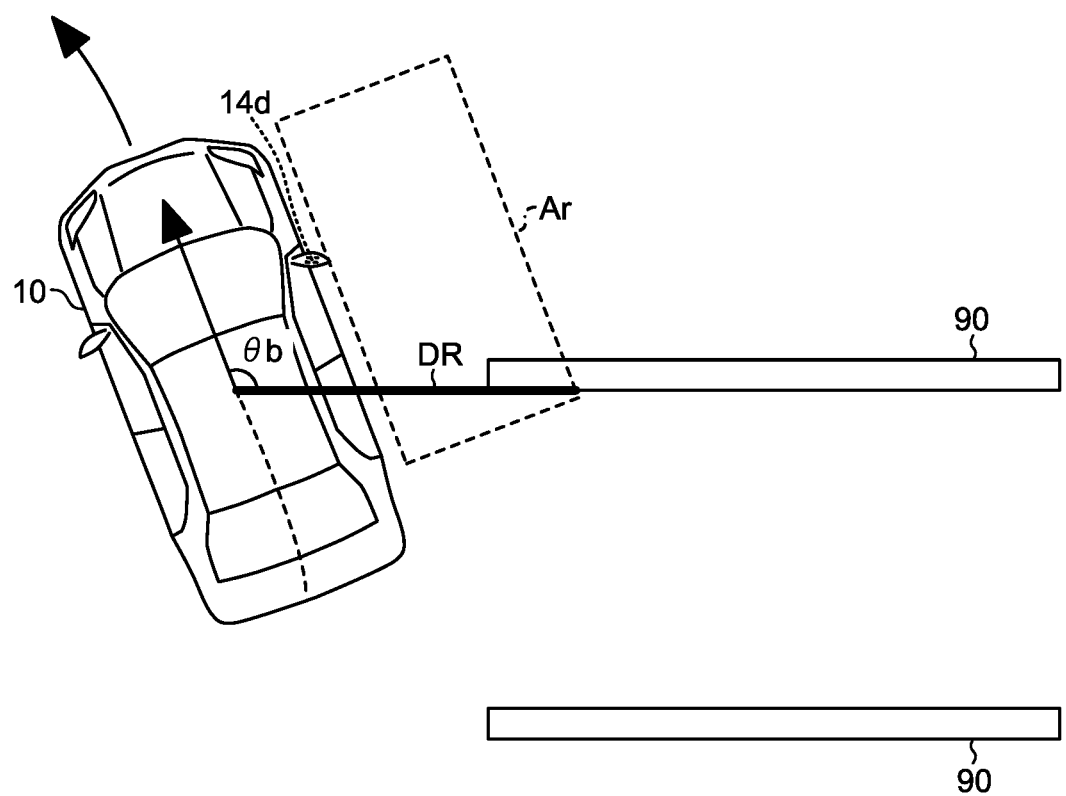
FIG. 9 is a plan view for explaining the correction of the length of the rear wheel shaft by the estimator.

Next, a description will be made on correction (hereinafter, direction correction) of the length TR of the rear wheel shaft AX being the direction parameter for calculating the vehicle directional deviation $D\theta$ and the direction $P\theta$ by the estimator 76. FIGS. 8 and 9 are plan views for explaining the correction of the length TR of the rear wheel shaft AX by the estimator 76. FIG. 8 is a plan view at the time tb and FIG. 9 is a plan view at the time tb+$\Delta$t. In FIGS. 8 and 9, the imaging region Ar of the imager (for example, the imager 14d) is represented by a dashed-dotted line rectangle.

As illustrated in FIG. 8, an angle between the direction of the vehicle 10 at the time tb and the extending direction (see a bold line DR) of the object 90 as the partition line is defined to be "$\theta a$". Thereafter, as illustrated in FIG. 9, the vehicle 10 travels from the time tb to the time tb+$\Delta$t while the steering 52 is rotated. An angle between the direction of the vehicle 10 at the time tb+$\Delta$t and the direction (see the bold line DR) of the object 90 is defined to be "$\theta b$". The estimator 76 calculates an object directional deviation $OD\theta$ (=$\theta a-\theta b$) as change in the direction of the object 90 relative to the vehicle 10 in a period from the time tb to the time tb+$\Delta$t. The estimator 76 may calculate the object directional deviation $OD\theta$ from, for example, the directions of the object 90 in the images generated by the imager 14 at the time tb and at the time tb+$\Delta$t. The vehicle directional deviation $D\theta$ is the same as the object directional deviation $OD\theta$ when the length TR of the rear wheel shaft AX is accurate. That is, with a difference between the vehicle directional deviation $D\theta$ and the object directional deviation $OD\theta$, there is error in the current length TR of the rear wheel shaft AX. In this case, the estimator 76 calculates a new length TR of the rear wheel shaft AX by the following equation (8) containing the difference between the right and left wheel-speed pulse variation amounts PR and PL, and corrects the current length TR to the new length TR. The travel distance DP per wheel-speed pulse in the equation (8) represents a new value corrected.

$$TR = OD\theta/DP \cdot (PR-PL) \qquad (8)$$

After calculating the new length TR of the rear wheel shaft AX for the direction correction, the estimator 76 calculates the vehicle directional deviation $D\theta$ by the equation (5). The estimator 76 may calculate the direction $P\theta_{t+\Delta t}$ of the vehicle 10 at the time tb+$\Delta$t by the equation (6) containing the newly calculated vehicle directional deviation $D\theta$. The estimator 76 stores, in the storage 72, the corrected, new length TR of the rear wheel shaft AX.

Figure 10:
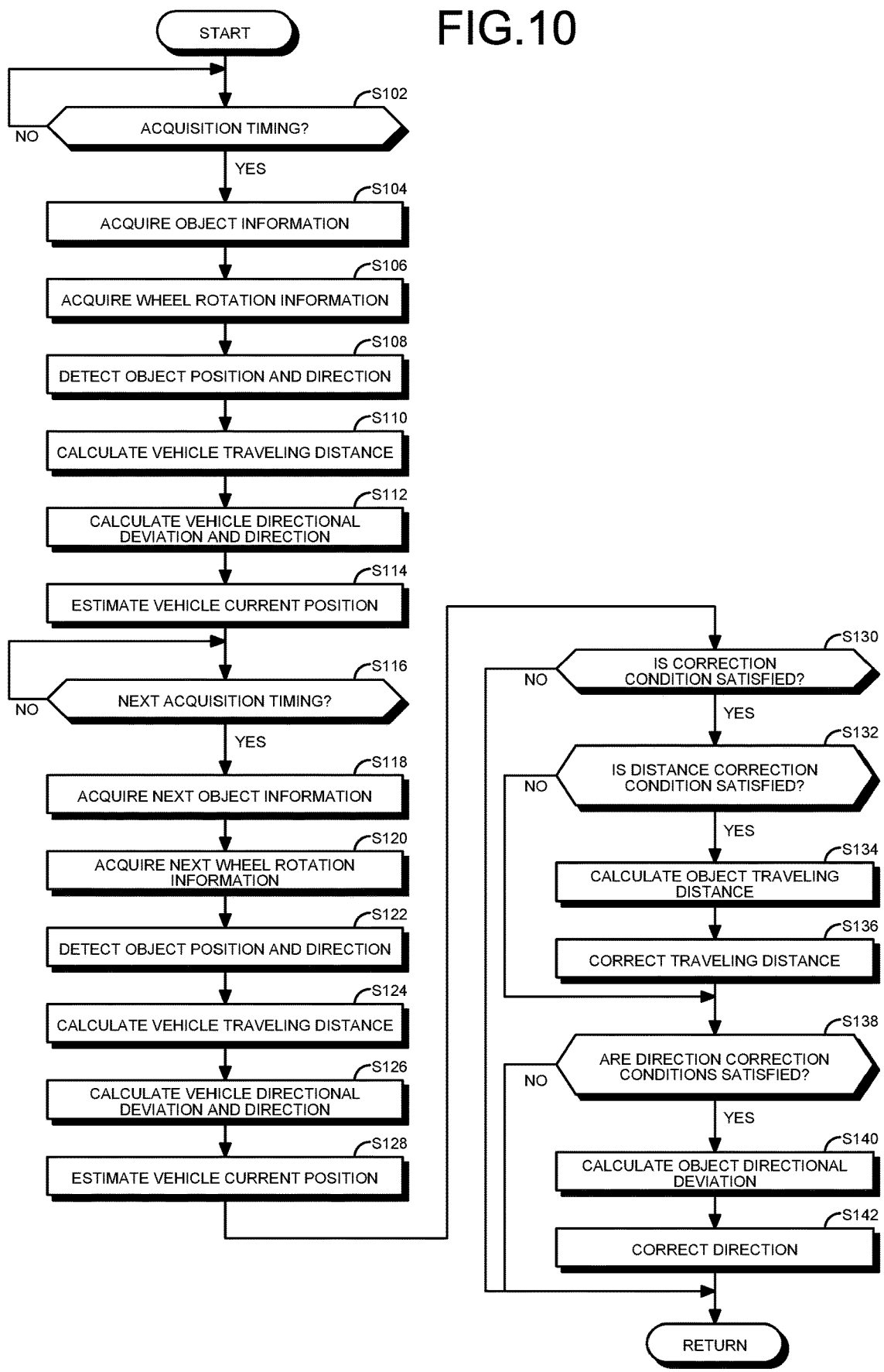
FIG. 10 is a flowchart of position estimation processing to be executed by a processor.

FIG. 10 is a flowchart of the position estimation processing executed by the processor 70. The processor 70 executes the position estimation processing by loading the position estimation program 80.

As illustrated in FIG. 10, the acquirer 74 of the processor 70 determines whether now is acquisition timing (S102). The acquisition timing represents a predetermined value and may be appropriately set. When determining that now is not the acquisition timing (No at S102), the acquirer 74 is placed in a standby state and repeats step S102. When determining that now is the acquisition timing (Yes at S102), the acquirer 74 acquires images from the imagers 14 as object information (S104). The acquirer 74 acquires wheel rotation information indicating the wheel-speed pulse numbers from the wheel-speed sensors 18 through the in-vehicle network 36 (S106). The acquirer 74 outputs the acquired object information and wheel rotation information to the estimator 76.

The estimator 76 detects the position and direction of the object 90 such as a partition line in a parking area on the basis of the images acquired from the acquirer 74 (S108). As illustrated in FIG. 6, the estimator 76 may detect the position of the front end 90a of the object 90 from the images, for example.

The estimator 76 calculates the vehicle travel distance DL from the previous acquisition of the wheel rotation information using the equation (3) containing the wheel rotation information acquired from the acquirer 74, as illustrated in FIG. 4 (S110). The estimator 76 calculates the vehicle directional deviation $D\theta$ from the previous acquisition of the wheel rotation information by the equation (5) containing the wheel rotation information acquired from the acquirer 74, as illustrated in FIGS. 4 and 5. The estimator 76 calculates the direction $P\theta$ of the vehicle 10 by the equation (6) containing the vehicle directional deviation $D\theta$ (S112). The estimator 76 calculates or estimates the current position SP of the vehicle 10 from the vehicle travel distance DL and the direction $P\theta$ of the vehicle 10 (S114). The estimator 76 outputs the estimated current position SP and direction $P\theta$ of the vehicle 10 to the assist 78 while the assist 78 performs automatic driving. The assist 78 continues the automatic driving in accordance with the current position SP and the direction $P\theta$ of the vehicle 10.

The acquirer 74 determines whether now is next acquisition timing (S116). When determines that now is not next acquisition timing (No at S116), the acquirer 74 is placed in a standby state and repeats step S116. When determining that now is the acquisition timing (Yes at S116), the acquirer 74 acquires, as object information, next images from the imagers 14 (S118) and acquires next wheel rotation information indicating the wheel-speed pulse numbers from the wheel-speed sensors 18 through the in-vehicle network 36 (S120). The acquirer 74 outputs the acquired object information and wheel rotation information to the estimator 76.

The estimator 76 detects the position and direction of the same object 90 detected at step S108 from the images acquired from the acquirer 74 (S122).

The estimator 76 calculates the vehicle travel distance DL from the previous acquisition of the wheel rotation information on the basis of the wheel rotation information newly acquired from the acquirer 74 (S124). The estimator 76 calculates the vehicle directional deviation $D\theta$ from the previous acquisition of the wheel rotation information on the basis of the wheel rotation information acquired from the acquirer 74, and calculates the direction $P\theta$ of the vehicle 10 (S126). The estimator 76 calculates the current position SP of the vehicle 10 from the vehicle travel distance DL and the direction $P\theta$ (S128). The estimator 76 outputs the estimated current position SP and direction $P\theta$ of the vehicle 10 to the assist 78 while the assist 78 performs the automatic driving.

The estimator 76 determines whether the vehicle travel distance DL calculated at step S124, the distance to the object 90 calculated from the images or the ranging information, shifting of the transmission 58 based on the positional information detected by the transmission sensor 62, and the vehicle speed calculated from the wheel rotation information satisfy any of the first correction condition to the fourth correction condition (S130). When determining no satisfaction of the correction conditions (No at S130), the estimator 76 repeats the processing from step S102 without correcting the travel distance DP per wheel-speed pulse being the distance parameter and the length TR of the rear wheel shaft AX being the direction parameter.

When determining satisfaction of any of the correction conditions (Yes at S130), the estimator 76 determines whether the steering angle indicated by the positional information of the steering 52 or the vehicle directional deviation $D\theta$ calculated at step S126 satisfies the distance correction condition (S132). When determines no satisfaction of the distance correction condition (No at S132), the estimator 76 executes the processing from step S138 again without correcting the distance parameter.

When determining satisfaction of the distance correction condition (Yes at S132), the estimator 76 calculates the object travel distance ODL from the two positions of the object detected at steps S108 and S122 (S134).

The estimator 76 corrects the travel distance by the above equation (7) containing the arithmetic mean value of the right and left wheel-speed pulse variation amounts PR and PL indicated by the wheel rotation information acquired at steps S106 and S120 and the travel distance ODL of the object 90 to calculate the travel distance DP per wheel-speed pulse as the distance parameter for the correction (S136). The estimator 76 stores the corrected, new distance parameter in the storage 72.

The estimator 76 determines whether the steering angle indicated by the positional information of the steering 52 and the vehicle directional deviation $D\theta$ calculated at step S126 satisfy the first and second direction correction conditions (S138). When determining no satisfaction of the first and second direction correction conditions (No at S138), the estimator 76 repeats the processing from step S102 without correcting the direction parameter.

When determining satisfaction of the first and second direction correction conditions (Yes at S138), the estimator 76 it calculates the object directional deviation $OD\theta$ from the directions of the object 90 detected at steps S108 and S122 (S140).

The estimator 76 corrects the direction by the equation (8) containing the difference between the right and left wheel-speed pulse variation amounts PR and PL indicated by the wheel rotation information and the object directional deviation $OD\theta$ to calculate the length TR of the rear wheel shaft AX being the direction parameter for the correction (S142). The estimator 76 stores the corrected, new direction parameter in the storage 72.

Thereafter, the processor 70 repeats the processing from step S102.

As described above, the position estimation device 34 calculates the vehicle directional deviation $D\theta$ as change in the direction $P\theta$ of the vehicle 10 on the basis of the wheel rotation information indicating the rotation of the wheels 13, and calculates the direction $P\theta$ of the vehicle 10 from the vehicle directional deviation $D\theta$ to estimate the current position SP of the vehicle 10 from the vehicle directional deviation $D\theta$. The position estimation device 34 calculates the object directional deviation $OD\theta$ as the deviation in the direction $P\theta$ of the object 90 on the basis of the vehicle directional deviation $D\theta$ and the object information, to correct the length TR of the rear wheel shaft AX being the direction parameter according to the object directional deviation $OD\theta$. Thereby, the position estimation device 34 can calculate the vehicle travel distance DL and the direction $P\theta$ more accurately than when only the distance parameter for calculating the travel distance DL is corrected, to improve the accuracy of estimates of the current position SP of the vehicle 10. As a result, the position estimation device 34 can improve the accuracy (for example, parking accuracy) of driving to the target position in the driving assistance including parking assistance by the assist 78.

The position estimation device 34 corrects the travel distance DP per wheel-speed pulse being the distance parameter when the direction $P\theta$ of the vehicle 10 falls within the first directional range with respect to the straight direction and the vehicle 10 travels substantially straight. The position estimation device 34 corrects the direction parameter when the direction of the vehicle 10 falls outside the second directional range and the vehicle 10 is turning. Thus, the position estimation device 34 corrects the distance parameter in the substantially straight traveling with less error due to approximation used in the equation (3) for calculating the vehicle travel distance DL, thereby improving the accuracy of the correction of the distance parameter. Furthermore, the position estimation device 34 corrects the direction parameter, which is difficult to correct during the straight traveling, while the vehicle 10 is turning, thereby improving the accuracy of the correction of the direction parameter.

The position estimation device 34 corrects the direction parameter when the direction of the vehicle 10 falls outside the second directional range with respect to the straight direction and the variation in the vehicle directional deviation $D\theta$ is within the predetermined deviation range. Thus, the position estimation device 34 corrects the direction parameter while the vehicle 10 is turning with a substantially constant turning radius and the steering 52 remains substantially at the same position, thereby improving the accuracy of the correction of the direction parameter.

The position estimation device 34 corrects the direction parameter or the distance parameter when the vehicle speed is lower than a threshold speed. Thus, the position estimation device 34 corrects the parameter during a low vehicle speed which enables accurate detection of the object 90, thereby improving the correction accuracy.

The position estimation device 34 corrects the direction parameter or the distance parameter when the distance to the object 90 is smaller than the threshold distance. Thus, the position estimation device 34 detects the object 90 nearby the distance of which is accurately calculated to correct the parameter, thereby improving the correction accuracy.

The position estimation device 34 corrects the direction parameter or the distance parameter on the basis of the vehicle travel distance DL which is accurately calculated on the basis of the wheel rotation information acquired outside of the predetermined period or section after shifting of the transmission 58. Thus, the position estimation device 34 corrects the parameter by the accurate vehicle travel distance DL, thereby improving the correction accuracy.

Modifications

Figure 11:
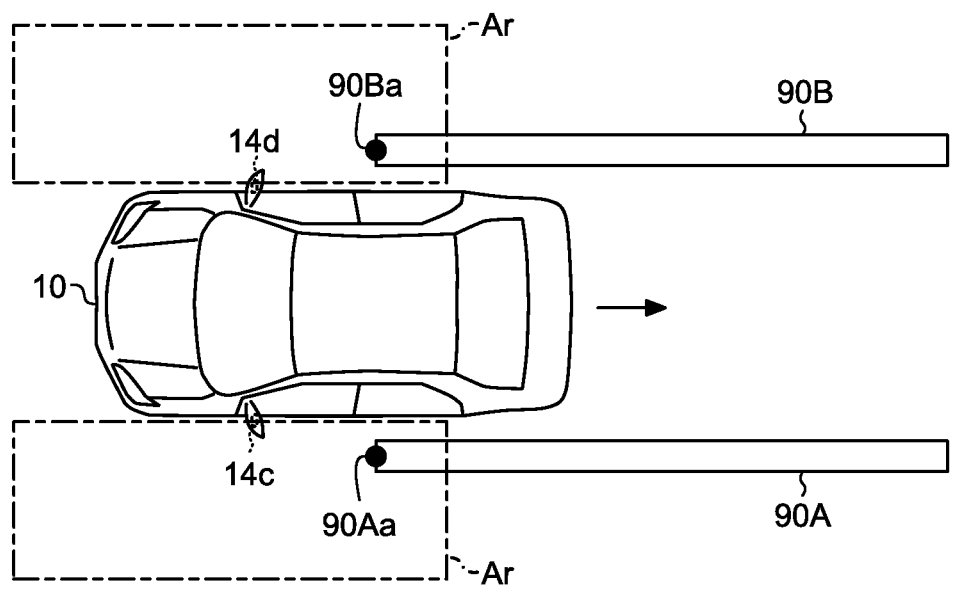
FIG. 11 is a plan view for explaining a method for calculating an object travel distance by an estimator according to a modification.
Figure 12:
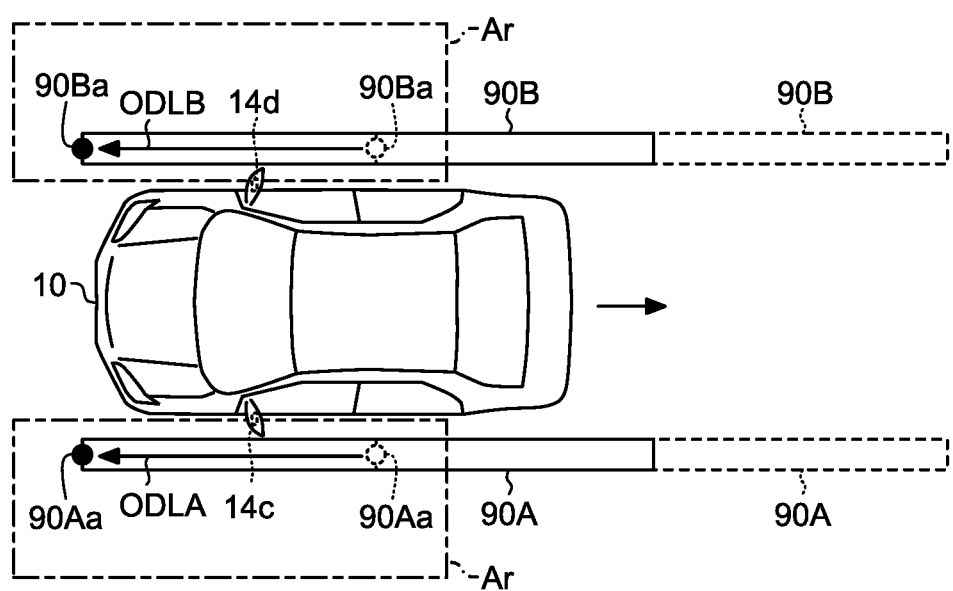
FIG. 12 is a plan view for explaining the method for calculating the object travel distance by the estimator in the modification.

Next, another example of calculating the object travel distance ODL will be described. FIGS. 11 and 12 are plan views for explaining the method for calculating the object travel distance ODL by the estimator 76 in the modification. FIG. 11 is a plan view of the vehicle 10 at time tc and FIG. 12 is a plan view of the same at time tc+Δt. At the time tc illustrated in FIG. 11, the vehicle 10 travels backward in a parking space between objects 90A and 90B being a pair of partition lines in a parking lot. While the vehicle 10 at the time tc+Δt travels backward to the position illustrated in FIG. 12, the objects 90A and 90B move relatively to the vehicle 10. The travel distances of the objects 90A and 90B relative to the vehicle 10 are defined to be object travel distances ODLA and ODLB, respectively. The estimator 76 locates front ends 90Aa and 90Ba of the objects 90A and 90B from the images by the imagers 14c and 14d to calculate the object travel distances ODLA and ODLB, respectively. The estimator 76 calculates, from the object travel distances ODLA and ODLB, the object travel distance ODL to be substituted into the equation (7) for correcting the travel distance DP per wheel-speed pulse. For example, the estimator 76 may calculate, as the object travel distance ODL, an arithmetic mean value (=(ODLA+ODLB)/2) of the object travel distances ODLA and ODLB. As with the above-mentioned embodiment, the estimator 76 may correct the travel distance DP per wheel-speed pulse on the basis of the calculated object travel distance ODL. The estimator 76 may calculate the object travel distance ODL to be substituted into the equation (7) from an arithmetic mean of the object travel distances of three or more objects 90.

The functions, connection relations, numbers, arrangement, and others of the elements in the embodiment and the modification may be appropriately changed, deleted, and so on within the scope of the invention and the scope equivalent to the scope of the invention. The embodiment and modification may be appropriately combined. The order of the steps in the embodiment and modification may be appropriately changed.

Although the above-mentioned embodiment has described the example that the estimator 76 estimates the vehicle travel distance DL and the direction Pθ and the current position SP of the vehicle 10, and corrects the distance parameter and the direction parameter, following the same flowchart, the invention is not limited to such an example. Alternatively, the estimator 76 may separately perform the estimation of the vehicle travel distance DL and the direction Pθ and the current position SP of the vehicle 10, and the correction of the distance parameter and the direction parameter, for example.

Although the above-mentioned embodiment has illustrated the wheel-speed pulse information corresponding to the wheel-speed pulse number detected by the wheel-speed sensors 18 as an example of the wheel rotation information, the wheel rotation information is not limited to the wheel-speed pulse information. Alternatively, the wheel rotation information may be information on the rotation of the output shaft of a driving source such as a motor associated with the rotation of the wheels, for example.

Although the above-mentioned embodiment has described the example that the estimator 76 identifies the object 90 from the images by the imagers 14 and calculates the object travel distance ODL, the calculation of the object travel distance ODL is not limited to such an example. Alternatively, the estimator 76 may identify the object 90 from the ranging information detected by the ranging units 16 and calculate the object travel distance ODL, for example. In this case, the ranging information is the object information. When the object 90 is a solid object such as an obstacle, the estimator 76 can more accurately detect the position of the object 90 on the basis of the ranging information. Furthermore, the estimator 76 may acquire both of the images and the ranging information as the object information to identify the object.

Although the above-mentioned embodiment has described the example that the estimator 76 corrects the direction parameter upon the satisfaction of the first and second direction correction conditions, the invention is not limited to such an example. Alternatively, the estimator 76 may correct the direction parameter upon satisfaction of the first or second direction correction conditions, for example.

Although the above-mentioned embodiment has described the example that the estimator 76 corrects the distance parameter or the direction parameter upon satisfaction of any of the first to fourth correction conditions, the invention is not limited to such an example. Alternatively, the estimator 76 may determine whether to correct on the basis of either of the following fifth and sixth correction conditions, for example.

Fifth Correction Condition: within a predetermined threshold time from the start of the driver assistance.

Sixth Correction Condition: after the vehicle 10 partially enters a parking space during the driver assistance.

The fifth and sixth correction conditions are conditions for enabling accurate detection of the object 90. The estimator 76 may correct the distance parameter or the direction parameter upon satisfaction of any of the first to fourth correction conditions and either of the fifth and sixth correction conditions.

Although the above embodiment has described the example of the parameter correction taking no account of error in the parameters, the invention is not limited to such an example. With large error in the distance parameter, for example, when the deviation between the vehicle travel distance DL and the object travel distance ODL is larger than a predetermined threshold distance for determination, the estimator 76 may correct the distance parameter. With large error in the direction parameter, for example, when the deviation between the vehicle directional deviation Dθ and the object directional deviation ODθ is larger than a predetermined threshold directional deviation for determination, the estimator 76 may correct the direction parameter.

The above-mentioned correction conditions, distance correction condition, and direction correction conditions may be appropriately changed. For example, in the respective conditions the term "larger than" may be changed to "equal to or larger than", and the term "smaller than" may be changed to "equal to or smaller than". The "outside range" and "within range" may include or exclude the boundaries of the range.

Although the above-mentioned embodiment has described the travel distance DP per wheel-speed pulse as an example of the distance parameter, the distance parameter may be appropriately changed to a parameter for converting the rotating amounts or the rotation speeds of the wheels 13 into the travel distance. Although the above-mentioned embodiment has described the length TR of the rear wheel shaft AX as an example of the direction parameter, the direction parameter may be appropriately changed to a parameter for converting the rotating amounts or the rotation speeds of the wheels 13 into the direction of the vehicle 10.

Although the above-mentioned embodiment has described the position estimation device 34 including the assist 78 by way of example, the assist 78 may be excluded from the position estimation device 34.

Although the above-mentioned embodiment has described the four-wheel vehicle 10 as an example of a mobile structure, the mobile structure is not limited to the vehicle 10. For example, the mobile structure may be a vehicle or an airplane that includes a drive source such as an internal combustion engine and an electric motor and a plurality of wheels to be rotated by the drive source.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A position estimation device comprising:
   an acquirer that acquires wheel rotation information and object information on an object, the wheel rotation information representing rotation of a plurality of wheels of a mobile structure; and
   an estimator that calculates a directional deviation of the mobile structure from the wheel rotation information and a predetermined direction parameter and calculates a direction of the mobile structure from the directional deviation of the mobile structure to estimate a position of the mobile structure, and calculates a directional deviation of the object from the object information to correct the direction parameter on the basis of the directional deviation of the mobile structure and the directional deviation of the object, the directional deviation of the mobile structure representing change in a direction of the mobile structure, the directional deviation of the object representing change in a direction of the object relative to the mobile structure, wherein the estimator:
   calculates a travel distance of the mobile structure on the basis of the wheel rotation information and a predetermined distance parameter and calculates a travel distance of the object relative to the mobile structure on the basis of the object information;
   corrects the distance parameter on the basis of the travel distance of the mobile structure and the travel distance of the object when the direction of the mobile structure falls within a predetermined first directional range with respect to a straight direction; and
   corrects the direction parameter when the direction of the mobile structure falls outside a second directional range which is more outside than the first directional range with respect to the straight direction.

2. The position estimation device according to claim 1, wherein the estimator corrects the direction parameter when the direction of the mobile structure falls outside the predetermined second directional range with respect to the straight direction and variation in the directional deviation of the mobile structure is within a predetermined deviation range.

3. The position estimation device according to claim 1, wherein the estimator corrects the direction parameter or the distance parameter when a speed of the mobile structure is lower than a threshold speed.

4. The position estimation device according to claim 1, wherein the estimator corrects the direction parameter or the distance parameter when a distance to the object is smaller than a predetermined threshold distance.

5. The position estimation device according to claim 1, wherein the estimator corrects the direction parameter or the distance parameter on the basis of the wheel rotation information acquired in a period or a section other than a predetermined period or section after shifting of a transmission for switching a gear ratio and forward and backward traveling directions of the mobile structure.

* * * * *